(12) United States Patent
Pollard et al.

(10) Patent No.: US 10,662,892 B2
(45) Date of Patent: May 26, 2020

(54) PISTON FOR INTERNAL COMBUSTION ENGINE HAVING HIGH TEMPERATURE-CAPABLE CROWN PIECE

(71) Applicant: Caterpillar Inc., Peoria, IL (US)

(72) Inventors: Michael Pollard, Peoria, IL (US); Indrajith Kizhakkethara, Dunlap, IL (US); Hugh McLean, Lebanon, IN (US)

(73) Assignee: Caterpillar Inc., Peoria, IL (US)

( * ) Notice: Subject to any disclaimer, the term of this patent is extended or adjusted under 35 U.S.C. 154(b) by 587 days.

(21) Appl. No.: 15/261,856

(22) Filed: Sep. 9, 2016

(65) Prior Publication Data

US 2018/0073462 A1    Mar. 15, 2018

(51) Int. Cl.
| | |
|---|---|
| *F02F 3/00* | (2006.01) |
| *B23K 20/12* | (2006.01) |
| *B23K 20/227* | (2006.01) |
| *C22C 38/40* | (2006.01) |
| *F02F 3/22* | (2006.01) |
| *F02F 3/26* | (2006.01) |
| *B23K 101/00* | (2006.01) |
| *B23K 103/04* | (2006.01) |

(52) U.S. Cl.
CPC ............ *F02F 3/003* (2013.01); *B23K 20/129* (2013.01); *B23K 20/227* (2013.01); *C22C 38/40* (2013.01); *F02F 3/0084* (2013.01); *F02F 3/22* (2013.01); *F02F 3/26* (2013.01); *B23K 2101/003* (2018.08); *B23K 2103/04* (2018.08); *B23K 2103/05* (2018.08); *C21D 2211/008* (2013.01); *F02F 2003/0061* (2013.01)

(58) Field of Classification Search
CPC .. F02F 3/0084; F02F 3/003; F02F 3/26; F02F 3/22; B23K 20/227; B23K 20/129
See application file for complete search history.

(56) References Cited

U.S. PATENT DOCUMENTS

| | | | | |
|---|---|---|---|---|
| 4,517,930 A | * | 5/1985 | Nakano | F01P 3/10 |
| | | | | 123/193.6 |
| 5,724,933 A | * | 3/1998 | Silvonen | F02F 3/0023 |
| | | | | 123/193.6 |
| 6,244,161 B1 | * | 6/2001 | Myers | C22C 38/12 |
| | | | | 92/224 |
| 7,406,941 B2 | | 8/2008 | Zhu | |
| 8,528,513 B2 | | 9/2013 | Haug | |
| 8,763,247 B2 | | 7/2014 | Kopchick | |
| 8,863,718 B2 | * | 10/2014 | Rebello | F02F 3/003 |
| | | | | 123/193.6 |

(Continued)

FOREIGN PATENT DOCUMENTS

| | | |
|---|---|---|
| DE | 102010052579 | 5/2012 |
| DE | 102011112244 | 3/2013 |

*Primary Examiner* — Abiy Teka
(74) *Attorney, Agent, or Firm* — Brannon Sowers & Cracraft

(57) ABSTRACT

A piston for an internal combustion engine includes a compound piston body having a crown piece joined to a skirt piece by a circumferential weld. The skirt piece is formed of a lower temperature-capable steel such as a low alloy steel, and the crown piece is formed of a higher temperature-capable steel having a martensitic microstructure and containing about 10% wt. or greater of chromium. Related methodology for making a piston is also disclosed.

15 Claims, 3 Drawing Sheets

(56) References Cited

U.S. PATENT DOCUMENTS

| | | | |
|---|---|---|---|
| 8,991,046 B2* | 3/2015 | Schulz | F02F 3/003 29/888.042 |
| 9,051,896 B2 | 6/2015 | Haug | |
| 2006/0191508 A1* | 8/2006 | Otsuka | B22D 30/00 123/193.6 |
| 2013/0213218 A1 | 8/2013 | Kaiser | |
| 2015/0059682 A1 | 3/2015 | Weinenger | |
| 2015/0176523 A1 | 6/2015 | Boczek | |

\* cited by examiner

PISTON FOR INTERNAL COMBUSTION ENGINE HAVING HIGH TEMPERATURE-CAPABLE CROWN PIECE

TECHNICAL FIELD

The present disclosure relates generally to a piston for an internal combustion engine, and more particularly to a compound piston body having a crown piece and a skirt piece formed of dissimilar materials and having improved temperature capability.

BACKGROUND

A great many different operating strategies and component designs are known from the field of internal combustion engines. Research and development has progressed for decades in relation to the manner in which factors such as fueling, exhaust gas recirculation, turbocharging, and variable valve actuation can be varied to produce different results. In addition to variation in these and other operating parameters, a great deal of research and testing effort has gone into the different ways that engine components, such as pistons, can be shaped and proportioned, and formed from various materials. One motivation driving advancements in combustion science and related research has been the desire to reduce relative amounts of certain emissions in engine exhaust, such as particulate matter and oxides of nitrogen or NOx. Other motivations relate to improving or optimizing performance, reducing fuel consumption, or still other ends.

It has long been known that engine duty cycle, generally understood as the patterns of use of an engine under field service conditions, can affect the way in which engine components perform and tolerate real world operation. Duty cycle also affects the extent and manner in which exhaust emissions, fuel consumption, and other performance variables respond to adjustments in the various controllable operating parameters. Some engines are operated at so-called low idle or medium idle conditions with only relatively minor variations in engine speed or engine load in the standard or expected engine duty cycle. As such, engineers may design engine components and establish operating parameters and expectations that are based upon the relatively stable operating points that are expected.

Other engine duty cycles are more dynamic, where the engine speed or engine load, or both, are routinely varied, sometimes to a significant degree. A diesel internal combustion engine in a transit locomotive, for example, could be increased in engine speed or engine load up to or close to a rated engine speed or engine load between stops or stations, but dropped to low idle conditions while the locomotive is stopped for passenger loading and unloading. One can imagine the transit locomotive engine experiencing relatively rapid and wide swings in such factors as temperature and in-cylinder pressure. Still other engine duty cycles may be much less predictable, and the engine can operate for long periods of time at high idle, relatively long periods of time at low idle, and then be rapidly ramped up and ramped down between higher speeds and loads and lower speeds and loads for a period of time.

Efforts to accommodate the various different patterns of engine operation and duty cycle have resulted at least in part in the great many engine operating strategies and component designs that can be seen in the art. For certain engines that are subjected to relatively harsh operating conditions, and notably frequent temperature swings, one area of research and development interest has included refinements in piston geometry and materials that can tolerate high temperatures and/or otherwise intense thermal fatigue-inducing conditions. Other research efforts have contemplated pistons that are well suited to conditions of relatively extreme mechanical duress. Commonly owned U.S. Pat. No. 6,155,157 to Jarrett is directed to a piston formed of two pieces structured to increase piston longevity where increased forces of combustion are experienced. Jarrett proposes a piston with a head member and a separate skirt member, joined together by inertia welding. The force of combustion acting on a crown portion of the head member is resisted by a support surface of a ring band. The skirt member is stated to resist the bending moment of the combustion forces on the head member.

SUMMARY OF THE INVENTION

In one aspect, a piston for an internal combustion engine includes a compound piston body defining a longitudinal axis, and including a crown piece, a skirt piece, and a weld attaching the crown piece to the skirt piece. The crown piece includes a first axial end having a combustion bowl formed therein, and an annular piston rim extending circumferentially around the combustion bowl, and a second axial end including a first annular wall extending in a first axial direction. The skirt piece includes a first axial end having a second annular wall extending in a second axial direction, a second axial end that includes a piston skirt and a wrist pin bore formed therein. The weld extends circumferentially around the longitudinal axis, and axially between the first annular wall and the second annular wall. The compound piston body is formed of a lower temperature-capable steel throughout the skirt piece, and a higher temperature-capable steel throughout the crown piece. The higher temperature-capable steel has a martensitic microstructure and contains about 10% wt. or greater of chromium, and a balance of iron, carbon and optional alloying elements.

In another aspect, a piston for an internal combustion engine includes a compound piston body defining a longitudinal axis, and including a crown piece and a skirt piece. The crown piece includes a first axial end having a combustion bowl formed therein and an annular piston rim extending circumferentially around the combustion bowl. The crown piece further includes a second axial end having a first annular wall extending in a first axial direction. The skirt piece includes a first axial end having a second annular wall extending in a second axial direction, a second axial end that includes a piston skirt and a wrist pin bore formed therein. The crown piece has a higher temperature capability and is formed of a martensitic stainless steel, and the skirt piece has a lower temperature capability and is formed of a low alloy steel. The piston further includes a weld extending circumferentially around the longitudinal axis, and axially between the first annular wall and the second annular wall to form a bonded interface of the martensitic stainless steel and the low alloy steel attaching the crown piece to the skirt piece.

In still another aspect, a method of making a piston for an internal combustion engine includes positioning a crown piece formed of a martensitic stainless steel relative to a skirt piece formed of a low alloy steel such that a first annular wall of the crown piece is coaxially aligned with a second annular wall of the skirt piece. The method further includes contacting the crown piece to the skirt piece such that the first annular wall of the crown piece abuts the second annular wall of the skirt piece, and welding the crown piece and the skirt piece together to form a bonded interface of the martensitic stainless steel and the low alloy steel attaching the crown piece to the skirt piece.

DETAILED DESCRIPTION

Figure 1:
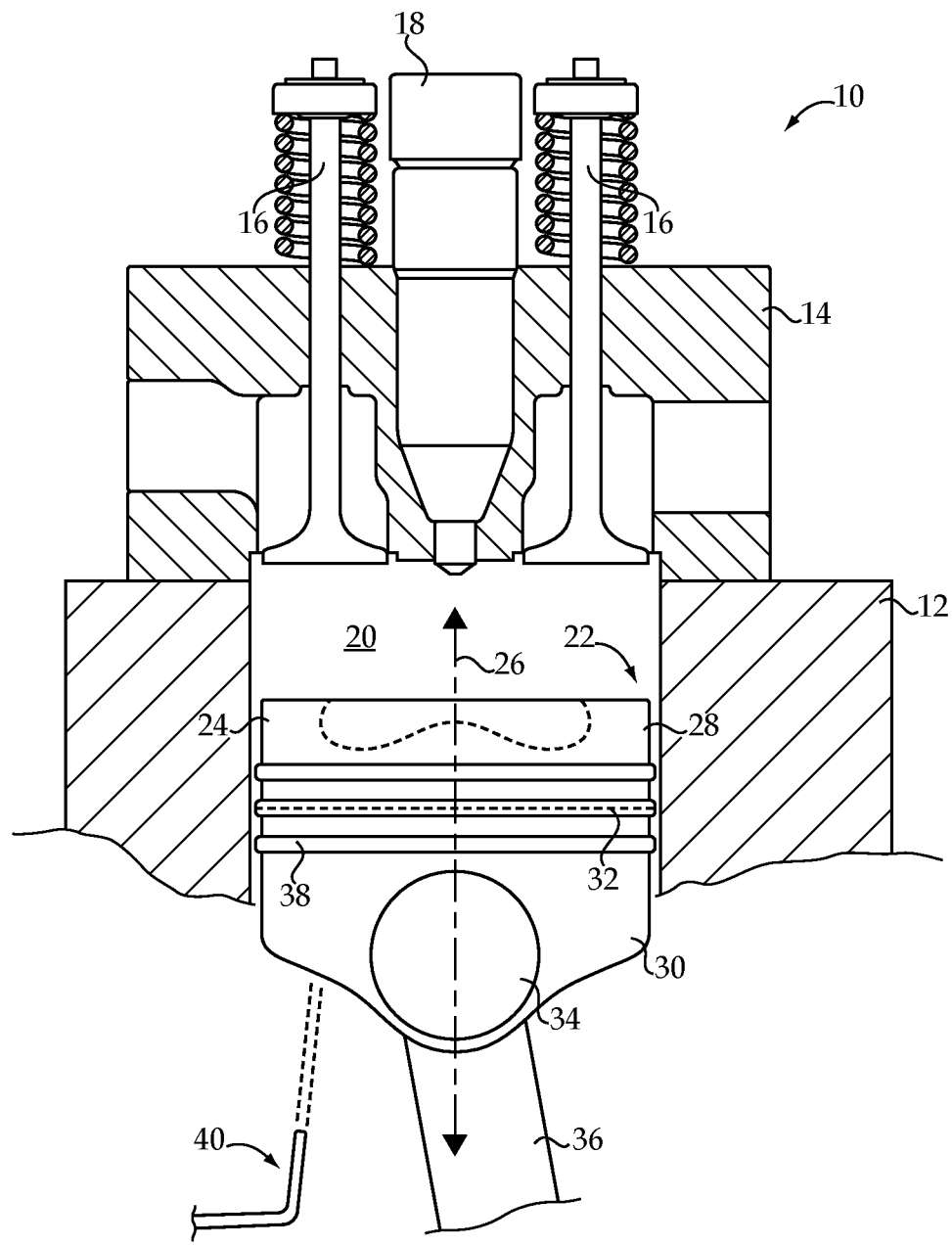
FIG. 1 is a partially sectioned side diagrammatic view of an internal combustion engine, according to one embodiment.

Referring to FIG. 1, there is shown an internal combustion engine 10 according to one embodiment. Internal combustion engine 10 (hereinafter "engine 10") may be a compression ignition diesel engine, including an engine housing 12 and an engine head 14 coupled to engine housing 12. A plurality of gas exchange valves 16 may be positioned at least partially within engine head 14, and movable in a conventional manner to admit air into a cylinder 20 formed in engine housing 12, and permit exhaust to be expelled from cylinder 20, according to a conventional four-stroke engine cycle. In view of the illustration in FIG. 1, either one of gas exchange valves 16 could be understood as an intake valve or an exhaust valve. Engine 10 may further be direct injected, and to this end includes a fuel injector 18 positioned within engine head 14 and extending into cylinder 20 for direct injection of a fuel therein. Engine 10 will typically be a multi-cylinder engine, having 4, 6, 8, 10 or more engine cylinders although only one cylinder 20 is depicted in FIG. 1. Each of a plurality of cylinders formed in engine housing 12 may be associated with at least one intake valve and at least one exhaust valve, and a fuel injector. In other embodiments, a port injected design or some other fuel injection or fuel delivery strategy might be used.

A piston 22 is movable within cylinder 20, analogously to any of the other pistons and cylinders that might be part of engine 10, between a top dead center position and a bottom dead center position in a generally conventional manner. Piston 22 may be coupled with a wrist pin 34 that is in turn coupled with a connecting rod 36 coupled with a crank shaft also in a generally conventional manner. Piston rings 38 are shown positioned upon piston 22. Although no cylinder liner is shown in FIG. 1, those skilled in the art will appreciate that a cylinder liner will typically be used. Engine 10 also includes an oil sprayer 40 that is positioned and oriented to spray oil for cooling and lubrication purposes toward an underside of piston 22 in a known manner. Piston 22 includes a compound piston body 24 defining a longitudinal axis 26, and including a crown piece 28, a skirt piece 30, and a weld 32 attaching crown piece 28 to skirt piece 30. Those skilled in the art will generally be familiar with the range of operating conditions that an internal combustion engine can experience during service, including compression ratios that can be more than 12:1, and temperatures within an engine cylinder that can regularly exceed 500° C. Although engine 10 and the components used therein are not limited to any particular operating strategy or set of operating conditions, the teachings of the present disclosure may find advantageous application in engines experiencing frequent severe thermal cycles above 500° C. As will be further apparent from the following description piston 22 may be uniquely configured by way of material selection, distribution and piston configuration to tolerate harsh operating conditions, especially with respect to the above-mentioned thermal cycling. Engine 10 may be a relatively large bore engine, having an engine cylinder diameter of about 150 mm to about 200 mm, and more particularly about 170 mm, although the present disclosure is not limited in this regard.

Figure 2:
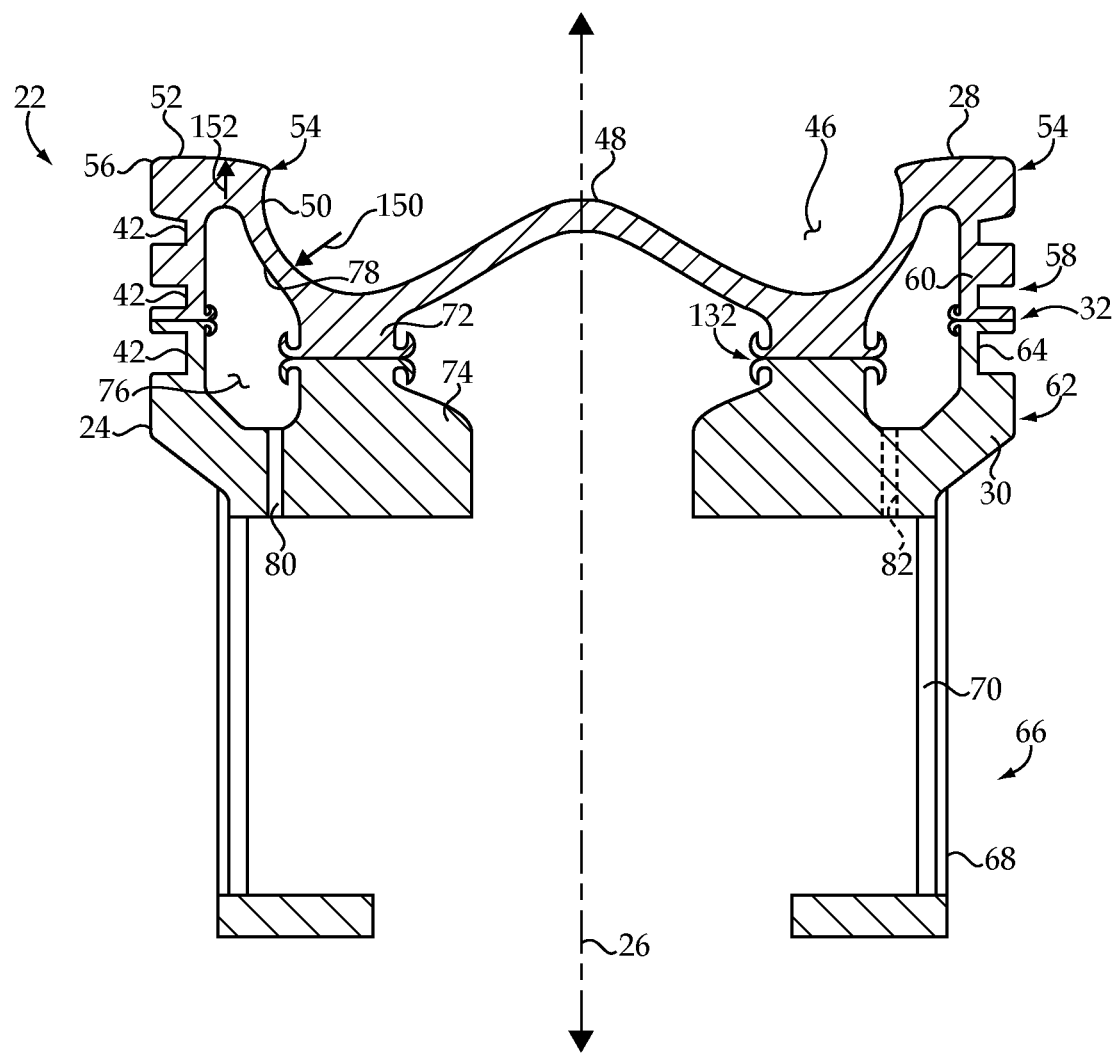
FIG. 2 is a sectioned side diagrammatic view of a piston suitable for use with the internal combustion engine of FIG. 1.

Referring also now to FIG. 2, there is shown a sectioned view of piston 22 illustrating additional features. As noted above, piston 22, more particularly compound piston body 24, may be formed from separate parts, namely, crown piece 28 and skirt piece 30. Crown piece 28 includes a first axial end 44 having a combustion bowl 46 formed therein, and an annular piston rim 52 extending circumferentially around combustion bowl 46. Crown piece 28 further includes a second axial end 58 including a first annular wall 72 extending in a first axial direction. The first axial direction could be understood as toward the bottom of the page in the FIG. 2 illustration. Crown piece 28 further includes another annular wall, described herein as a third annular wall 60. It can be noted that third annular wall 60 includes a plurality of piston ring grooves 42 formed therein, and it will be understood by those skilled in the art that piston rings can be fitted into grooves 42 in a generally conventional manner. Skirt piece 30 includes a first axial end 62 having a second annular wall 74 and a fourth annular wall 64 each extending in a second axial direction opposite to the first axial direction, and a second axial end 66 that includes a piston skirt 68 and a wrist pin bore 70 formed in piston skirt 68. It should be appreciated that the terms "first," "second," "third," and "fourth" should be understood in a non-limiting sense and, for instance, any of numerals 72, 74, 60, 62 could be understood to refer to a first annular wall, a second annular wall, and so on.

In the section plane of FIG. 2, much of piston skirt 68 is not visible, however, it will be appreciated that piston skirt 68 extends circumferentially around longitudinal axis 26 in a generally known manner. Weld 32 can be seen to extend circumferentially around longitudinal axis 26 as well, and axially between annular wall 60 and annular wall 64. Weld 132 can be seen to extend circumferentially around longitudinal axis 26, and axially between annular wall 72 and annular wall 74. Weld flash (not numbered) can be seen associated with each of welds 32 and 132, and may be present to varying degrees in a piston according to the present disclosure that is finished and prepared for service depending upon the extent to which the piston is machined after joining the crown piece and skirt piece, as further discussed herein. It can also be seen from FIG. 2 that weld 132 is located at a radially inward location and weld 32 is located at a radially outward location, and are also located at different axial locations in the illustrated embodiment. Each of welds 32 and 132 extends circumferentially around longitudinal axis 26, and may have the form of an inertia weld as further discussed herein. In any event, it will be understood that each of welds 32 and 132 forms a bonded interface of materials of crown piece 28 and skirt piece 30 which, in a manner and for reasons further discussed herein, will typically be dissimilar materials. An oil gallery 76 extends between the radially inward location of weld 132 and the radially outward location of weld 32 and circumferentially around longitudinal axis 26. A backside cooling surface 78 extends circumferentially around longitudinal axis 26 and is located generally opposite at least a part of combustion bowl 46 and services to dissipate heat of crown piece 28 to oil conveyed through oil gallery 76, along with other exposed surfaces forming oil gallery 76. As also shown in FIG. 2, an oil inlet 80 may extend through skirt piece 30 to enable oil spray from oil sprayer 40 to be supplied into oil gallery 76, and an oil outlet 82 may also extend through skirt piece 30 to enable oil once passed through at least a portion of oil gallery 76 to drain.

In a practical implementation strategy combustion bowl 46 may have a non-uniform profile, generally as depicted in FIG. 2, defined by a profile of a combustion bowl surface 50. A center cone 48 may generally form an apex that is intersected by longitudinal axis 26, and from central cone 48 bowl surface 50 may extend outwardly and downwardly initially, and then curve upwardly so as to eventually begin to extend back radially inwardly such that combustion bowl 46 has a reentrant profile. In at least some instances, the reentrant profile of combustion bowl 46 can enhance mixing of injected fuel and air. A sharp lip 54 may extend circumferentially around longitudinal axis 26 and is located radially between a radially outward boundary of combustion bowl 46 and a radially inward boundary of annular rim 52 within a thermal fatigue-sensitive zone of compound piston body 24. It can be seen that annular rim 52 has a radiused profile extending from a piston body outer surface 56 to sharp lip 54. In at least some instances the sharp lip 54, as opposed to a smoothly radiused lip, can assist in reducing the production of certain emissions such as particulate matter. The radiused profile of annular rim 52 can assist in enabling gasses to be squished out of crevice volume between annular rim 52 and engine head 14 in at least certain instances. These various features of piston 22 can affect the extent to which heat is dissipated from material forming crown piece 28 and the extent to which the various features are susceptible to degradation or damage during service, such as thermal fatigue failure.

As discussed above, piston 22 is structured for operating under certain harsh conditions, notably relatively high pressures and temperatures in relatively high horsepower, high power density engines. Pistons operating in such environments have been observed, over time, to experience thermal fatigue of material, particularly material in the piston crown and forming parts of the combustion bowl and/or piston rim can experience thermal fatigue and ultimately fail. A related problem can be corrosion in the nature of oxidation that can occur to a relatively great extent at high temperatures. In either case, failure of the piston can ultimately occur, potentially leading to catastrophic failure of the engine. Parts of piston body 24, and in particular parts of combustion bowl 46 in radially outward regions, and parts of piston rim 52 at radially inward locations, including lip 54, can be understood as thermal fatigue-sensitive locations. In piston 22, the selection and location of high temperature-capable material enables piston 22 to live longer than conventional pistons placed in such environments.

In one practical implementation strategy, compound piston body 24 is formed of a lower temperature-capable steel throughout skirt piece 30, and formed of a higher temperature-capable steel throughout crown piece 28. The higher temperature-capable steel may include a martensitic microstructure and contain about 10% wt. or greater of chromium, and a balance of iron, carbon and optional alloying elements. It should be understood that the present disclosure and the description of the composition of compound piston body 24 does not exclude trace elements or impurities, as will be understood by those skilled in the art. In a further practical implementation strategy, the higher temperature-capable steel may contain about 10% wt. to about 14% wt. of chromium, and more particularly still may contain about 11.5% to about 13.5% by wt. of chromium. The higher temperature-capable steel may further include a martensitic stainless steel such as a type 410 martensitic stainless steel, however, still other types are contemplated herein including type 422 and potentially still others. As used herein the term "temperature-capable," and whether a particular material type is understood as "high temperature-capable" or "higher temperature-capable" can be determined empirically, or by objective analysis of the material's properties. A higher temperature-capable steel will typically be capable of sustained heating to a temperature from about 600° C. to about 700° C., or possibly higher, without permanent alteration of structural or material properties. The higher temperature-capable steel may contain a range of carbon content, in some instance about 1% wt. or less, potentially 0.3% wt. or less, or still another amount or range. The present disclosure is not limited to any particular carbon content. The higher temperature-capable steel may further contain substantially less of nickel than certain other known piston materials, and in certain embodiments may contain less than 2% wt. of nickel. More particularly, the higher temperature-capable steel may contain no more than trace amounts of nickel.

In addition to the material composition parameters discussed above, certain other parameters and notably thermal expansion and thermal gradient properties of the higher temperature-capable steel may be exploited for purposes of reducing thermal fatigue and extending service life. In particular, the higher temperature-capable steel may have a coefficient of thermal expansion (CTE) that is less than $12 \times 10^{-6}$ m/m/K. In a further practical implementation strategy, the CTE may be about $10 \times 10^{-6}$ m/m/K or less. The low alloy steel of which skirt piece 30 is formed may have a similar coefficient of thermal expansion.

INDUSTRIAL APPLICABILITY

Figure 3:
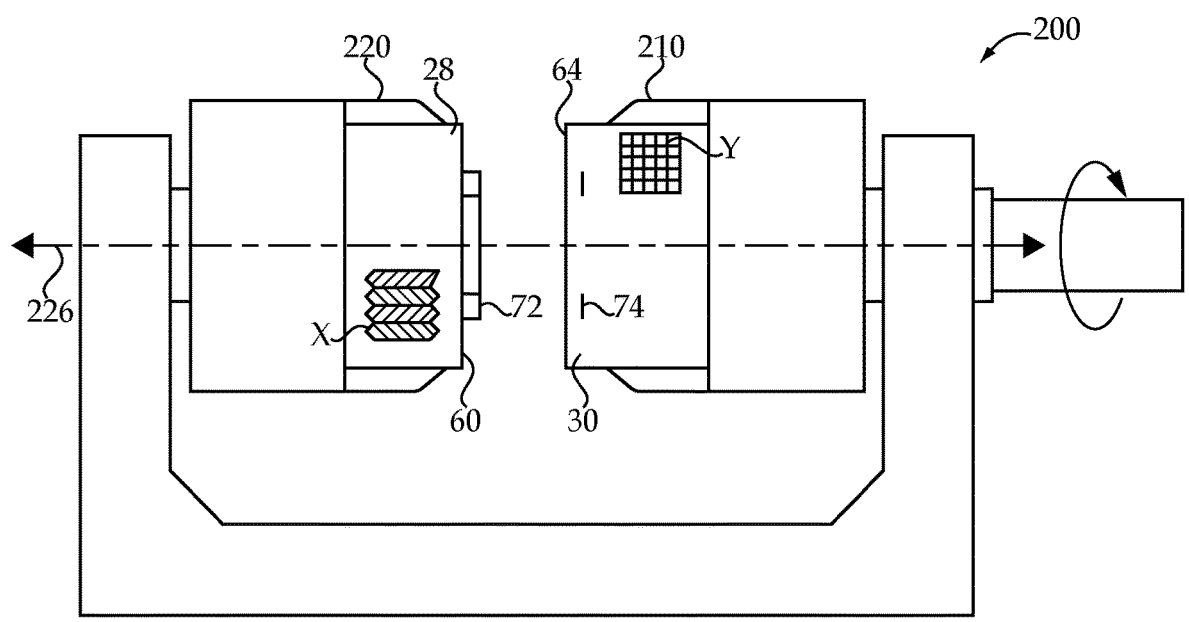
FIG. 3 is a diagrammatic view of a piston at one stage of manufacturing.
Figure 4:
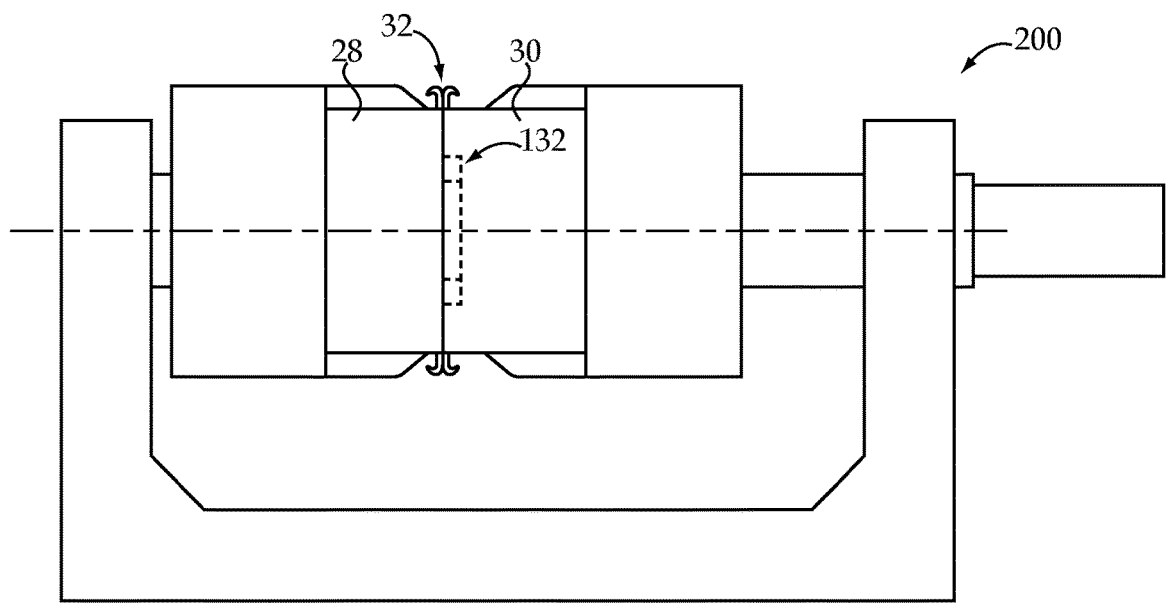
FIG. 4 is a diagrammatic view of a piston at another stage of manufacturing.

Referring to the drawings generally, but also in particular now to FIG. 3, there is shown a welding apparatus 200 in the nature of an inertia welding apparatus having a first chucking mechanism 210 shown as it might appear clamping skirt piece 30 therein, and a second chucking mechanism 210 shown as it might appear clamping crown piece 28 therein. Annular walls 60 and 72 are shown in crown piece 28, as well as annular walls 74 and 64 in skirt piece 30. At reference letter X a diagrammatic representation of a martensitic microstructure is shown, and at reference letter Y a diagrammatic illustration of a different microstructure such as an austenitic microstructure or a ferritic microstructure, either of which is different from the martensitic microstructure as shown. In other instances, the microstructure of skirt piece 30 might be martensitic.

In FIG. 3 apparatus 200 is depicted in a manner illustrating chucking mechanism 210 capable of rotation and as it might appear where crown piece 28 and skirt piece 30 are positioned generally coaxially about an axis 226. In alternative implementations, rather than setting up welding apparatus 200 so that skirt piece 30 is rotated while crown piece 28 is held stationary, crown piece 28 could be rotated while skirt piece 30 is held stationary. A variety of different parameters relating to inertia welding crown piece 28 and skirt piece 30 together to form piston body 24 might be varied, all within the scope of the present disclosure. Prior to inertia welding skirt piece 30 and crown piece 28 the respective pieces may be positioned such that annular wall 72 or 60, either of which could be considered a first annular wall, is in coaxial alignment with annular wall 74 or 62, respectively, of skirt piece 30, either of which could be considered a second annular wall. As shown in FIG. 3, crown piece 28 and skirt piece 30 may be moved into contact with one another while rotating such that annular wall 72 and annular wall 60 abut annular wall 74 and 62. Consistent with known inertia welding principles crown piece 28 and skirt piece 30 may be welded together by rotating one of crown piece 28 and skirt piece 30 relative to the other of crown piece 28 and skirt piece 30 to form a bonded interface of the martensitic stainless steel of crown piece 28 and the low alloy steel of skirt piece 30 attaching crown piece 28 to skirt piece 30. Other welding techniques could be applied to weld the components of piston 22 together without departing from the scope of the present disclosure, however, and techniques other than inertia welding or friction welding could be used. After welding skirt piece 30 and crown piece 28 together, piston body 24 may be machined to remove excess weld flash, and processed according to other known processing techniques including heat treatment to relieve residual stress in welds 32 and 132, or other such welds as the case may be.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A piston for an internal combustion engine comprising:
a compound piston body defining a longitudinal axis, and including a crown piece, a skirt piece, and a weld attaching the crown piece to the skirt piece;
the crown piece including a first axial end having a combustion bowl formed therein and an annular piston rim extending circumferentially around the combustion bowl, and a second axial end including a first annular wall extending in a first axial direction;
the skirt piece including a first axial end having a second annular wall extending in a second axial direction, a second axial end that includes a piston skirt having a wrist pin bore formed therein;
the weld extending circumferentially around the longitudinal axis, and axially between the first annular wall and the second annular wall; and
the compound piston body being formed of a higher temperature-capable steel throughout the crown piece, and a lower temperature-capable steel throughout the skirt piece;
the higher temperature-capable steel having a martensitic microstructure, a coefficient of thermal expansion less than $12 \times 10^{-6}$ m/m/K, and containing 10% wt. or greater of chromium, and a balance of iron, carbon and optional alloying elements with no more than trace amounts of nickel; and
the lower temperature-capable steel having a coefficient of thermal expansion less than $12 \times 10^{-6}$ m/m/K.

2. The piston of claim 1 wherein the higher temperature-capable steel contains 10% wt. to 14% wt. of chromium.

3. The piston of claim 2 wherein the higher temperature-capable steel contains 11.5% wt. to 13.5% wt. of chromium.

4. The piston of claim 2 wherein the lower temperature-capable steel includes a low alloy steel, and the higher temperature-capable steel includes a martensitic stainless steel.

5. The piston of claim 1 wherein the crown piece further includes a third annular wall and the skirt piece further includes a fourth annular wall, and further comprising a second weld extending circumferentially around the longitudinal axis and axially between the third annular wall and the fourth annular wall.

6. The piston of claim 5 wherein the first weld is located at a radially inward location and the second weld is located at a radially outward location, and an oil gallery extends between the radially inward location and the radially outward location and circumferentially around the longitudinal axis.

7. A piston for an internal combustion engine comprising:
a compound piston body defining a longitudinal axis, and including a crown piece and a skirt piece;
the crown piece including a first axial end having a combustion bowl formed therein and an annular piston rim extending circumferentially around the combustion bowl, and a second axial end including a first annular wall extending in a first axial direction;
the skirt piece including a first axial end having a second annular wall extending in a second axial direction, a second axial end that includes a piston skirt, and a wrist pin bore formed between the first axial end and the second axial end of the skirt piece;
the crown piece having a higher temperature capability and being formed of a martensitic stainless steel containing at least 10% wt. chromium and no more than trace amounts of nickel, and the skirt piece having a lower temperature capability and being formed of a low alloy non-martensitic steel; and
a weld extending circumferentially around the longitudinal axis, and axially between the first annular wall and the second annular wall to form a bonded interface of the martensitic stainless steel and the low alloy non-martensitic steel attaching the crown piece to the skirt piece;
wherein the crown piece and the skirt piece have substantially similar coefficients of thermal expansion.

8. The piston of claim 7 wherein the crown piece includes a third annular wall extending in the first axial direction and the skirt piece includes a fourth annular wall extending in the second axial direction, and further comprising a second weld extending circumferentially around the longitudinal axis, and axially between the third annular wall and the fourth annular wall to form a second bonded interface of the martensitic stainless steel and the low alloy steel attaching the crown piece to the skirt piece.

9. The piston of claim 8 wherein the crown piece includes a backside cooling surface located opposite the combustion bowl, and an oil gallery is formed in the compound piston body and extends circumferentially around the longitudinal axis and is defined in part by the backside cooling surface.

10. The piston of claim 9 wherein the combustion bowl has a reentrant profile, and the annular rim has a radiused profile.

11. The piston of claim 10 wherein the crown piece includes a sharp lip extending circumferentially around the longitudinal axis and located radially between a radially outward boundary of the combustion bowl and a radially inward boundary of the annular rim within a thermal fatigue-sensitive zone of the compound piston body.

12. The piston of claim 7 wherein the martensitic stainless steel includes a 410 stainless steel containing 10% wt. to 14% wt. of chromium.

13. A method of making a piston for an internal combustion engine comprising:

positioning a crown piece formed of a martensitic stainless steel relative to a skirt piece formed of a low alloy steel such that a first annular wall of the crown piece is coaxially aligned with a second annular wall of the skirt piece;

contacting the crown piece to the skirt piece such that the first annular wall of the crown piece abuts the second annular wall of the skirt piece; and welding the crown piece and the skirt piece together to form a bonded interface of the martensitic stainless steel and the low alloy steel attaching the crown piece to the skirt piece wherein the crown piece contains more than 10% wt. chromium and no more than trace amounts of nickel;

wherein the crown piece and the skirt piece have similar coefficients of thermal expansion less than $10 \times 10^{-6}$ m/m/K.

14. The method of claim 13 wherein the welding of the crown piece and the skirt piece includes friction welding the crown piece and the skirt piece together.

15. The method of claim 14 wherein the contacting of the crown piece further includes contacting the crown piece to the skirt piece such that a third annular wall of the crown piece abuts a fourth annular wall of the skirt piece, and wherein the welding of the crown piece and the skirt piece further includes welding the crown piece and the skirt piece together to form a second bonded interface of the martensitic stainless steel and the low alloy steel attaching the crown piece to the skirt piece.

* * * * *